United States Patent
Zhang et al.

(10) Patent No.: US 11,101,941 B2
(45) Date of Patent: Aug. 24, 2021

(54) REFERENCE SYMBOL INDICATION METHOD, DEVICE, AND SYSTEM

(71) Applicant: HUAWEI TECHNOLOGIES CO., LTD., Guangdong (CN)

(72) Inventors: Ruiqi Zhang, Beijing (CN); Jianqin Liu, Beijing (CN)

(73) Assignee: Huawei Technologies Co., Ltd., Guangdong (CN)

( * ) Notice: Subject to any disclaimer, the term of this patent is extended or adjusted under 35 U.S.C. 154(b) by 60 days.

(21) Appl. No.: 16/369,067

(22) Filed: Mar. 29, 2019

(65) Prior Publication Data

US 2019/0229857 A1   Jul. 25, 2019

Related U.S. Application Data

(63) Continuation of application No. PCT/CN2016/100856, filed on Sep. 29, 2016.

(51) Int. Cl.
  *H04L 1/18* (2006.01)
  *H04W 76/27* (2018.01)
  (Continued)

(52) U.S. Cl.
  CPC .......... *H04L 1/1861* (2013.01); *H04L 1/0016* (2013.01); *H04L 5/0016* (2013.01);
  (Continued)

(58) Field of Classification Search
  None
  See application file for complete search history.

(56) References Cited

U.S. PATENT DOCUMENTS

2011/0237283 A1   9/2011   Shan et al.
2012/0195271 A1   8/2012   Lee et al.
(Continued)

FOREIGN PATENT DOCUMENTS

CN    102316526 A    1/2012
CN    102957491 A    3/2013
(Continued)

OTHER PUBLICATIONS

Huawei, "Control signalling for MU-MIMO", 3GPP TSG-RAN WG1#59b, R1-100249, 3GPP, Jan. 12, 2010, 7 pages.
(Continued)

*Primary Examiner* — Nicholas Sloms
(74) *Attorney, Agent, or Firm* — Fish & Richardson P.C.

(57) ABSTRACT

The present disclosure relates to reference symbol indication methods, devices, and systems. One example method includes receiving, by a user equipment, a target parameter including a target reference symbol indication sent by a base station, determining a target transmission mode and target reference symbol information based on the target parameter and a preset reference symbol mapping relationship, generating a target reference symbol based on the target reference symbol information, and demodulating data based on the target reference symbol and the target transmission mode, where the preset reference symbol mapping relationship includes a mapping relationship among a reference symbol indication, reference symbol information, and a transmission mode.

17 Claims, 6 Drawing Sheets

(51) Int. Cl.
   *H04L 1/00*      (2006.01)
   *H04W 72/12*     (2009.01)
   *H04L 27/00*     (2006.01)
   *H04L 27/26*     (2006.01)
   *H04L 5/00*      (2006.01)

(52) U.S. Cl.
   CPC .......... *H04L 5/0023* (2013.01); *H04L 5/0051* (2013.01); *H04L 5/0091* (2013.01); *H04L 27/0014* (2013.01); *H04L 27/2613* (2013.01); *H04W 72/12* (2013.01); *H04W 72/1273* (2013.01); *H04W 76/27* (2018.02); *H04L 2027/0046* (2013.01); *H04L 2027/0053* (2013.01)

(56) References Cited

U.S. PATENT DOCUMENTS

| | | | |
|---|---|---|---|
| 2012/0213186 A1* | 8/2012 | Ng | H04L 5/0007 370/329 |
| 2013/0022087 A1* | 1/2013 | Chen | H04L 27/2613 375/147 |
| 2013/0265980 A1 | 10/2013 | Zhu et al. | |
| 2014/0056269 A1* | 2/2014 | Zhang | H04B 7/0689 370/329 |
| 2014/0133395 A1 | 5/2014 | Nam et al. | |
| 2014/0233466 A1 | 8/2014 | Pourahmadi et al. | |
| 2019/0090142 A1 | 3/2019 | Liu et al. | |

FOREIGN PATENT DOCUMENTS

| | | |
|---|---|---|
| JP | 2014517580 A | 7/2014 |
| WO | 2012163306 A1 | 12/2012 |
| WO | 2018031066 A1 | 2/2018 |

OTHER PUBLICATIONS

Huawei, "Signalling support for transparent MU MIMO", 3GPP TSG-RAN WG1#60, R1-101059, 3GPP, Feb. 16, 2010, 5 pages.
Huawei, "DCI discussion on transparent MU-MIMO", 3GPP TSG-RAN WG1#60b, R1-101957, 3GPP, Apr. 6, 2010, 5 pages.
Huawei, "DCI discussion on transparent MU-MIMO", 3GPP TSG-RAN WG1#61, R1-103103, 3GPP, May 4, 2010, 5 pages.
Office Action issued in Japanese Application No. 2019-515,520 dated Jan. 31, 2020, 6 pages (With English Translation).
Extended European Search Report issued in European Application No. 16917201.2 dated Sep. 4, 2019, 9 pages.
Office Action issued in Japanese Application No. 2019-515520 dated Jun. 16, 2020, 4 pages (with English translation).
Intel Corporation, "Remaining details of enhanced DM-RS support", 3GPP TSG RAN WG1 Meeting #83 R1-156520, Anaheim, USA, Nov. 15-22, 2015, total 3 pages.
Samsung, "New WID Proposal: Enhancements on Full-Dimension (FD) MIMO for LTE", 3GPP TSG RAN Meeting #70 RP-151856, Sitges, Spain, Dec. 7-10, 2015, total 7 pages.
3GPP TS 36.212 V13.2.0 (Jun. 2016); 3rd Generation Partnership Project; Technical Specification Group Radio Access Network; Evolved Universal Terrestrial Radio Access (E-UTRA); Multiplexing and channel coding(Release 13), total 140 pages.
3GPP TS 36.211 V13.2.0 (Jun. 2016); 3rd Generation Partnership Project; Technical Specification Group Radio Access Network; Evolved Universal Terrestrial Radio Access (E-UTRA); Physical channels and modulation(Release 13), total 168 pages.
3GPP TS 36.213 V13.2.0 (Jun. 2016); 3rd Generation Partnership Project; Technical Specification Group Radio Access Network; Evolved Universal Terrestrial Radio Access (E-UTRA); Physical layer procedures(Release 13), total 381 pages.
PCT International Search Report in International Application No. PCT/CN2016/100856, dated May 31, 2017, 6 pages.
EPO Communication pursuant to Article 94(3) EPC issued in European Application No. 16917201.2 dated Dec. 17, 2020, 8 pages.
ZTE Corporation, "Evaluation/analysis on reduction of supported downlink Transmission Modes and Text Proposal", 3GPP TSG RAN WG1 Meeting #69, R1-122117, Prague, Czech Republic, May 21-25, 2012, 6 pages.

* cited by examiner

REFERENCE SYMBOL INDICATION METHOD, DEVICE, AND SYSTEM

CROSS-REFERENCE TO RELATED APPLICATION

This application is a continuation of International Application No. PCT/CN2016/100856, filed on Sep. 29, 2016, the disclosure of which is hereby incorporated by reference in its entirety.

TECHNICAL FIELD

The present invention relates to the communications field, and in particular, to a reference symbol indication method, a device, and a system.

BACKGROUND

In a Long Term Evolution (Long Term Evolution, LTE) system, a multiple-input multiple-output (Multiple Input and Multiple Output, MIMO) technology is widely applied. In the MIMO technology, a plurality of transmit antennas and receive antennas are respectively used at a transmit end and a receive end, to transmit and receive a signal by using the plurality of antennas at the transmit end and the receive end, so that space resources can be fully used, and multiple-input multiple-output is implemented by using the plurality of antennas. In this way, system channel capacity can be multiplied without increasing spectrum resources and antenna transmit power.

Downlink MIMO transmission may include an open-loop transmission mode and a closed-loop transmission mode. In the open-loop transmission mode, a downlink data channel is demodulated based on a common reference signal (Common Reference Signal, CRS), that is, by using the CRS. The closed-loop transmission mode includes a CRS-based closed-loop transmission mode and a closed-loop transmission mode based on a demodulation reference signal (De-Modulation Reference Signal, DMRS). In CRS-based open-loop and closed-loop transmission solutions, a port of the CRS is shared by all users in a cell, is fixed, and cannot be dynamically changed. Therefore, a base station does not need to dynamically notify user equipment (User Equipment, UE) of information about the port of the CRS.

In an existing LTE standard, there is only a DMRS-based closed-loop transmission solution and no DMRS-based open-loop transmission solution. Different from a CRS-based open-loop transmission solution, in a DMRS-based transmission solution, a quantity of ports of a DMRS is dynamically changed. Therefore, the port of the DMRS needs to be dynamically notified. However, in the prior art, there is no DMRS port indication solution for the DMRS-based open-loop transmission solution.

SUMMARY

The present invention provides a reference symbol indication method, a device, and a system, to support DMRS-based open-loop transmission, and provides a DMRS port indication method for the DMRS-based open-loop transmission.

A first aspect of embodiments of the present invention provides a reference symbol indication method, and the method includes:

receiving, by user equipment, a target parameter sent by a base station, where the target parameter includes a target reference symbol indication; determining, by the user equipment, a target transmission mode and target reference symbol information based on the target parameter and a preset reference symbol mapping relationship, where the preset reference symbol mapping relationship includes a mapping relationship between a reference symbol indication, reference symbol information, and a transmission mode, and the transmission mode is a transmission mode used by the base station to send data and includes an open-loop transmission mode and a closed-loop transmission mode; and generating, by the user equipment, a target reference symbol based on the target reference symbol information, and demodulating the data based on the target reference symbol and the target transmission mode.

In the embodiments of the present invention, the terminal has the preset reference symbol mapping relationship. After receiving the target parameter (the target parameter including the target reference symbol indication) sent by the base station, the user equipment determines, based on the target parameter and the preset reference symbol mapping relationship, that the transmission mode corresponding to the target reference symbol indication is the open-loop transmission mode or the closed-loop transmission mode, determines the target reference symbol information, then generates the target reference symbol based on the target reference symbol information, and demodulates the data based on the target reference symbol and the transmission mode. In an LTE system, the reference symbol is a DMRS, and the target parameter sent by the base station includes a DMRS indication. The user equipment has a preset DMRS mapping relationship, and may determine, based on the target parameter, that a transmission mode corresponding to the DMRS indication is an open-loop transmission mode or a closed-loop transmission mode, determine a DMRS message corresponding to the DMRS indication, generate a DMRS based on the DMRS message, and then demodulate data based on the determined transmission mode. In this way, a DMRS port indication method for DMRS-based open-loop transmission can be provided.

With reference to the first aspect, in a first possible implementation of the first aspect, the target parameter further includes a target transmission mode indication; the preset reference symbol mapping relationship includes a first mapping table and a second mapping table, where the first mapping table includes a mapping relationship between the reference symbol indication and the reference symbol information in the open-loop transmission mode, and the second mapping table includes a mapping relationship between the reference symbol indication and the reference symbol information in the closed-loop transmission mode; and the determining, by the user equipment, a target transmission mode and target reference symbol information based on the target parameter and a preset reference symbol mapping relationship includes: determining, by the user equipment, the target transmission mode based on the target transmission mode indication, determining, in the first mapping table and the second mapping table, a target mapping table based on the target transmission mode, and then determining, in the target mapping table, the target reference symbol information corresponding to the target reference symbol indication, where the target mapping table is one of the first mapping table and the second mapping table.

In this manner, the preset reference symbol mapping relationship of the user equipment exists in a form of two different mapping relationship tables, respectively corresponding to the reference symbol mapping relationship in the open-loop transmission and the reference symbol mapping relationship in the closed-loop transmission mode. In addition, the base station notifies the user equipment of the transmission mode by using the target transmission mode indication without using the reference symbol indication, so that the user equipment first determines a to-be-used mapping relationship table by using the target transmission mode indication, and then obtains the target reference symbol from the table. In this manner, the solution can be more feasible.

With reference to the first possible implementation of the first aspect, in a second possible implementation of the first aspect, the receiving, by user equipment, a target parameter sent by a base station may be performed in a manner of: receiving, by the user equipment, the target parameter sent by the base station through a downlink control channel PDCCH, where a first field in the PDCCH is used to indicate the target transmission mode indication, and a second field in the PDCCH is used to indicate the target reference symbol indication.

The manner in which the target transmission mode indication and the target reference symbol indication are notified through the PDCCH is relatively flexible, and the base station may dynamically adjust a transmission mode of downlink data.

With reference to the first possible implementation of the first aspect, in a third possible implementation of the first aspect, the receiving, by user equipment, a target parameter sent by a base station includes: receiving, by the user equipment, the target transmission mode indication sent by the base station by using Radio Resource Control RRC signaling, and receiving the target reference symbol indication sent by the base station through the PDCCH.

With reference to the first aspect, in a fourth possible implementation of the first aspect, the preset reference symbol mapping relationship includes a third mapping table, where the third mapping table includes a mapping relationship between the reference symbol indication and the reference symbol information in the open-loop transmission mode and a mapping relationship between the reference symbol indication and the reference symbol information in the closed-loop transmission mode; and the determining, by the user equipment, a target transmission mode and target reference symbol information based on the target parameter and a preset reference symbol mapping relationship includes: determining, by the user equipment, in the third mapping table, the target transmission mode based on the target reference symbol indication, and determining, in the third mapping table, the target reference symbol information corresponding to the target reference symbol indication.

In this manner, the preset reference symbol mapping relationship of the user equipment exists in a form of a mapping relationship table, and different reference symbol indication values indicate different transmission modes and different reference symbol information. Therefore, the base station does not need to notify the user equipment of the transmission mode used for the downlink data of the base station, so that a quantity of bits used for transmitting indication information can be reduced.

With reference to the fourth possible implementation of the first aspect, in a fifth possible implementation of the first aspect, the reference symbol is a demodulation reference signal DMRS in an LTE system, the reference symbol indication is a DMRS indication, the reference symbol information is a DMRS message, and the DMRS message includes a scrambling code Nscid; and different values of the scrambling code Nscid are used to indicate different transmission modes corresponding to the DMRS indication, where in a DMRS message corresponding to a DMRS indication in the open-loop transmission mode, Nscid=1.

With reference to the fourth or the fifth possible implementation of the first aspect, in a sixth possible implementation of the first aspect, the reference symbol is a demodulation reference signal DMRS in an LTE system, the reference symbol indication is a DMRS indication, the reference symbol information is a DMRS message, and a reserved state in a correspondence between the reference symbol indication and the reference symbol information is used to indicate the DMRS message in the open-loop transmission mode.

With reference to any possible implementation of the first aspect, in a seventh possible implementation of the first aspect, when the terminal moves at a high speed, performance is very poor when OCC=4, and it is very difficult to support high dimensional MIMO. Therefore, the reference symbol information includes an orthogonal cover code OCC, and a length of an orthogonal cover code in reference symbol information in the open-loop transmission mode is less than or equal to 2.

With reference to any possible implementation of the first aspect, in an eighth possible implementation of the first aspect, the reference symbol information includes a quantity of transport layers of data, and the quantity of transport layers of data in the reference symbol information in the open-loop transmission mode is less than or equal to 4. By limiting a quantity of layers of data, a quantity of bits used to indicate DMRS port information can be reduced.

With reference to the fourth to the eighth possible implementations of the first aspect, in a ninth possible implementation of the first aspect, the receiving, by user equipment, a target parameter sent by a base station includes: receiving, by the user equipment, the target parameter sent by the base station through a PDCCH.

According to a second aspect, an embodiment of the present invention provides a reference symbol indication method, and the method includes:

sending, by a base station, data to user equipment; determining, by the base station, a target parameter based on a preset reference symbol mapping relationship, and a target transmission mode and target reference symbol information that are used to send the data, where the preset reference symbol mapping relationship includes a mapping relationship between a reference symbol indication, reference symbol information, and a transmission mode, and the transmission mode includes an open-loop transmission mode and a closed-loop transmission mode; sending, by the base station, the target parameter to the user equipment, where the target parameter is used to instruct the user equipment to determine the target transmission mode and the target reference symbol information that are used by the base station to send the data, generate a target reference symbol based on the target reference symbol information, and then demodulate the data based on the target reference symbol and the target transmission mode.

In this embodiment of the present invention, both the base station and the user equipment have a preset reference symbol mapping relationship, and the transmission mode and the reference symbol information that are used to send the data are indicated between the base station and the user equipment by using the target parameter, so that the user equipment can demodulate the data. In an LTE system, the reference symbol is a DMRS. This embodiment of the present invention may provide a DMRS port indication method for DMRS-based open-loop and closed-loop transmission between the base station and the user equipment.

With reference to the second aspect, in a first possible implementation of the second aspect, the target parameter includes a target transmission mode indication and a target reference symbol indication; the preset reference symbol mapping relationship includes a first mapping table and a second mapping table, where the first mapping table includes a mapping relationship between the reference symbol indication and the reference symbol information in the open-loop transmission mode, and the second mapping table includes a mapping relationship between the reference symbol indication and the reference symbol information in the closed-loop transmission mode; and the determining, by the base station, a target parameter based on a preset reference symbol mapping relationship, and a target transmission mode and target reference symbol information that are used to send the data includes: determining, by the base station, the target transmission mode indication based on the target transmission mode; and determining, by the base station, in the first mapping table and the second mapping table, a target mapping table based on the target transmission mode, and then determining, in the target mapping table, the target reference symbol indication corresponding to the target reference symbol information, where the target mapping table is one of the first mapping table and the second mapping table.

With reference to the first possible implementation of the second aspect, in a second possible implementation of the second aspect, the sending, by the base station, the target parameter to the user equipment includes: sending, by the base station, the target parameter to the user equipment through a downlink control channel PDCCH, where a first field in the PDCCH is used to indicate the target transmission mode indication, and a second field in the PDCCH is used to indicate the target reference symbol indication.

With reference to the first possible implementation of the second aspect, in a third possible implementation of the second aspect, the sending, by the base station, the target parameter to the user equipment includes: sending, by the base station, the target transmission mode indication to the user equipment by using Radio Resource Control RRC signaling, and sending the target reference symbol indication to the user equipment through a PDCCH.

With reference to the second aspect, in a fourth possible implementation of the second aspect, the target parameter includes a target reference symbol indication; the preset reference symbol mapping relationship includes a third mapping table, where the third mapping table includes a mapping relationship between the reference symbol indication and the reference symbol information in the open-loop transmission mode and a mapping relationship between the reference symbol indication and the reference symbol information in the closed-loop transmission mode; and the determining, by the base station, a target parameter based on a preset reference symbol mapping relationship, and a target transmission mode and target reference symbol information that are used to send the data includes: determining, by the user equipment, in the third mapping table, the target reference symbol indication based on the target transmission mode and the target reference symbol information.

With reference to the fourth possible implementation of the second aspect, in a fifth possible implementation of the second aspect, the reference symbol is a demodulation reference signal DMRS in an LTE system, the reference symbol indication is a DMRS indication, the reference symbol information is a DMRS message, and the DMRS message includes a scrambling code Nscid; and different values of the scrambling code Nscid are used to indicate different transmission modes corresponding to the DMRS indication, where in a DMRS message corresponding to a DMRS indication in the open-loop transmission mode, Nscid=1.

With reference to any possible implementation of the second aspect, in a sixth possible implementation of the second aspect, the reference symbol information includes an orthogonal cover code OCC, and a length of an orthogonal cover code in reference symbol information in the open-loop transmission mode is less than or equal to 2.

With reference to any possible implementation of the second aspect, in a seventh possible implementation of the second aspect, the reference symbol information includes a quantity of transport layers of data, and the quantity of transport layers of data in the reference symbol information in the open-loop transmission mode is less than or equal to 4.

With reference to the fourth or the fifth possible implementation of the second aspect, in an eighth possible implementation of the second aspect, the sending, by the base station, the target parameter to the user equipment includes: sending, by the base station, the target reference symbol indication to the user equipment through a PDCCH.

The embodiments of the present invention provide user equipment, and a specific implementation corresponds to functions of the reference symbol indication method provided in the first aspect. The functions may be implemented by using hardware, or may be implemented by executing a corresponding software program by hardware. The hardware and software include one or more unit modules corresponding to the foregoing functions, and the unit module may be software and/or hardware.

According to a third aspect, in a possible design, user equipment in the embodiments of the present invention includes:
  a receiving unit, configured to receive a target parameter sent by a base station, where the target parameter includes a target reference symbol indication;
  a reference symbol information determining unit, configured to determine a target transmission mode and target reference symbol information based on the target parameter and a preset reference symbol mapping relationship, where the preset reference symbol mapping relationship includes a mapping relationship between a reference symbol indication, reference symbol information, and a transmission mode, and the transmission mode is a transmission mode used by the base station to send data and includes an open-loop transmission mode and a closed-loop transmission mode;
  a reference symbol generation unit, configured to generate a target reference symbol based on the target reference symbol information; and
  a data demodulation unit, configured to demodulate the data based on the target reference symbol and the target transmission mode.

According to a fourth aspect, in a possible design, user equipment in the embodiments of the present invention includes:
  a transceiver, a processor, and a memory connected to each other, where the memory is configured to store program code, and the
processor invokes the program code in the memory, to
perform the following operations:

receiving a target parameter sent by a base station by
using the transceiver, where the target parameter
includes a target reference symbol indication; determining a target transmission mode and target reference
symbol information based on a preset reference symbol
mapping relationship in the memory and the target
parameter; generating a target reference symbol based
on the target reference symbol information; and then
demodulating data based on the target reference symbol
and the target transmission mode, where the preset reference symbol mapping relationship
includes a mapping relationship between a reference
symbol indication, reference symbol information, and a
transmission mode, and the transmission mode is a
transmission mode used by the base station to send data
and includes an open-loop transmission mode and a
closed-loop transmission mode.

The embodiments of the present invention provide a base station, and a specific implementation corresponds to functions of the reference symbol indication method provided in the second aspect. The functions may be implemented by using hardware, or may be implemented by executing a corresponding software program by hardware. The hardware and software include one or more unit modules corresponding to the foregoing functions, and the unit module may be software and/or hardware.

According to a fifth aspect, in a possible design, a base station in the embodiments of the present invention includes:

a sending unit, configured to send data to user equipment; and the sending unit is further configured to send a target
parameter to the user equipment, where the target
parameter is used to instruct the user equipment to
determine the target transmission mode and the target
reference symbol information that are used by the base
station to send the data, generate a target reference
symbol based on the target reference symbol information, and then demodulate the data based on the target
reference symbol and the target transmission mode.

According to a sixth aspect, in a possible design, a base station in the embodiments of the present invention includes:

a transceiver, a processor, and a memory connected to
each other, where the memory is configured to store program code, and the
processor invokes the program code in the memory, to
perform the following operations:

determining a target parameter based on a preset reference
symbol mapping relationship, and a target transmission
mode and target reference symbol information that are
used to send the data; and sending the target parameter
to the user equipment by using the transceiver, where the preset reference symbol mapping relationship
includes a mapping relationship between a reference
symbol indication, reference symbol information, and a
transmission mode, and the transmission mode includes
an open-loop transmission mode and a closed-loop
transmission mode; and the target parameter is used to
instruct the user equipment to determine the target
transmission mode and the target reference symbol
information that are used by the base station to send the
data, generate a target reference symbol based on the
target reference symbol information, and then demodulate the data based on the target reference symbol and
the target transmission mode.

According to a seventh aspect, the embodiments of the present invention further provide a reference symbol indication system, where the system includes the user equipment described in the fourth aspect and the base station described in the sixth aspect.

It can be learned from the foregoing technical solutions that, the solutions in the embodiments of the present invention have the following beneficial effects:

In the embodiments of the present invention, in the LTE system, the reference symbol is the DMRS, the target parameter sent by the base station includes the DMRS indication, and the user equipment has the preset DMRS mapping relationship, and may determine, based on the target parameter, that the transmission mode corresponding to the DMRS indication is the open-loop transmission mode or the closed-loop transmission mode, determine the DMRS message corresponding to the DMRS indication, generate the DMRS based on the DMRS message, and then demodulate the data based on the determined transmission mode. In this way, the DMRS port indication method for the DMRS-based open-loop transmission can be provided.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present invention.

The technical solutions in the embodiments of the present invention may be applied to various wireless communications systems such as a Code Division Multiple Access (CDMA) network, a Time Division Multiple Access (TDMA) network, a Frequency Division Multiple Access (FDMA) network, an Orthogonal FDMA (OFDMA) network, and a Single Carrier FDMA (SC-FDMA) network. The terms "network" and "system" are often used interchangeably. The CDMA network may implement radio technologies such as Universal Terrestrial Radio Access (UTRA) and CDMA2000. UTRA includes Wideband CDMA (W-CDMA) and other CDMA variants. CDMA2000 covers IS-2000, IS-95, and IS-856 standards. The TDMA network may implement radio technologies such as Global System for Mobile Communications (GSM). The OFDMA network may implement radio technologies such as Evolved UTRA (E-UTRA), Ultra Mobile Broadband (UMB), IEEE 802.11 (Wi-Fi), IEEE 802.16 (WiMAX), IEEE 802.20, and Flash-OFDM. UTRA and E-UTRA are a part of a Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents of an organization named "3rd Generation Partnership Project" (3GPP). CDMA2000 and UMB are described in documents of an organization named "3rd Generation Partnership Project 2" (3GPP2). The technologies described in this specification may be applied to the wireless networks and radio technologies mentioned above as well as other wireless networks and radio technologies. For clarity, particular aspects of the technologies are described below for LTE, and LTE terminology is used in much of the description below.

In the embodiments of the present invention, solutions are described in detail by using a downlink MIMO technology applied to LTE or 5G as a background.

User equipment used in the present invention may include a handheld device that has a wireless communication function, an in-vehicle device, a wearable device, a computing device, or another processing device connected to a wireless modem, and user equipment (User Equipment, UE for short), a mobile station (Mobile station, MS for short), a terminal (terminal), terminal equipment (Terminal Equipment) that are of various forms, and the like.

Figure 1:
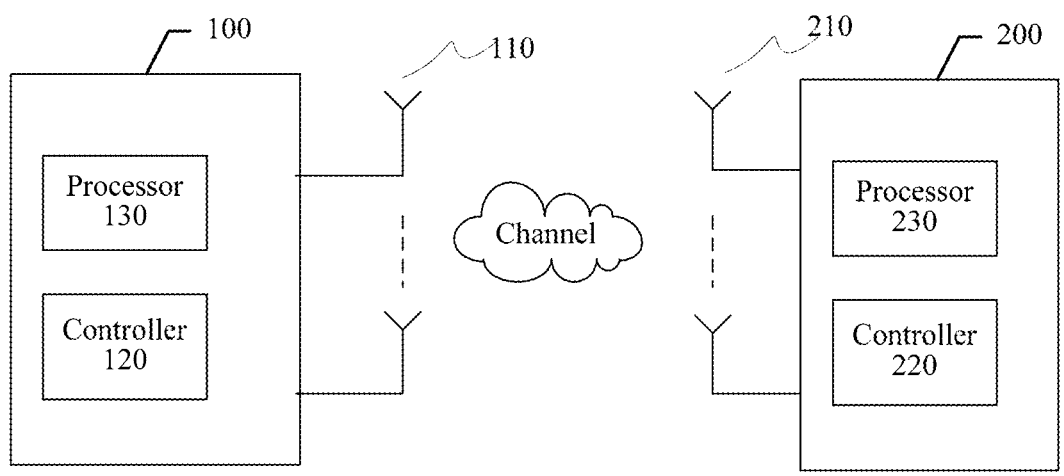
FIG. 1 is a schematic diagram of a MIMO communications system according to an embodiment of the present invention.

FIG. 1 shows a MIMO-based wireless communications system. The wireless communications system includes a base station (referred to as an evolved NodeB in LTE, that is, an eNB) and user equipment.

The base station includes a transmitter 100, and the base station inputs an information signal to the transmitter 100. The transmitter 100 includes a controller 120 that controls an overall operation of the transmitter 100 and a transmitted-signal processor 130. The transmitted-signal processor 130 performs error coding, maps an input bit to a modulation symbol, and generates a to-be-transmitted signal for each transmit antenna 110. After performing frequency up-conversion, filtering, and amplification, the transmitter 100 transmits the to-be-transmitted signal to the user equipment through a communication channel from a corresponding transmit antenna 110.

A receiver 200 of the user equipment demodulates and decodes a signal received at each antenna 230. The receiver 200 includes a controller 220 that controls an operation of the receiver 200 and a received-signal processor 230. The received-signal processor 230 demodulates and decodes a signal transmitted from the base station.

In an LTE system, when both a base station and user equipment have a plurality of antennas, spatial multiplexing can be used.

Figure 2:
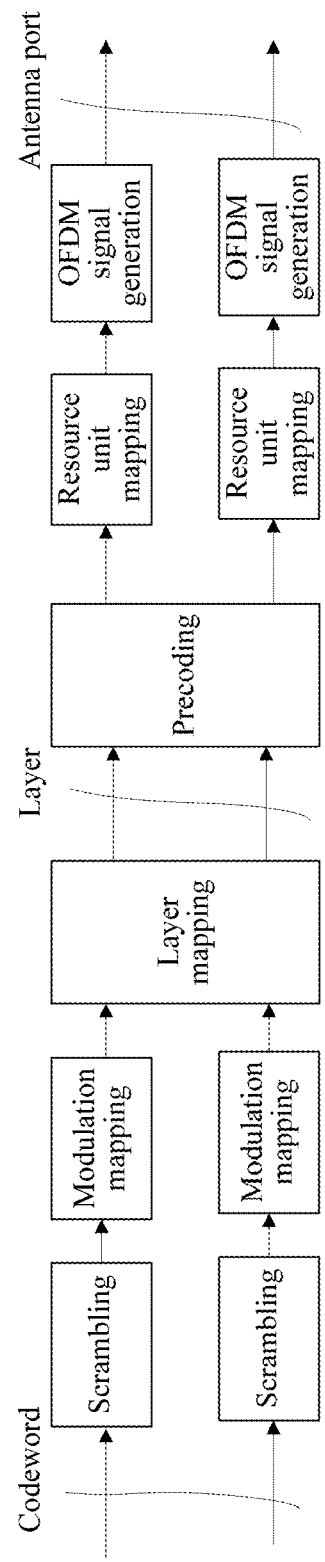
FIG. 2 is a schematic diagram of a downlink physical channel processing process according to an embodiment of the present invention.

FIG. 2 is a schematic diagram of a MIMO-based downlink signal processing process.

A base station performs channel coding on data from an upper layer to form codewords; demodulates different codewords to generate modulation symbols; then performs layer mapping by combining the modulation signals of the different codewords together; and precodes data obtained after the layer mapping, then maps the data to different antenna ports, performs resource mapping on each antenna port, generates an orthogonal frequency division multiplexing (Orthogonal Frequency Division Multiplexing, OFDM) symbol, and transmits the symbol.

Downlink MIMO transmission may include an open-loop transmission mode and a closed-loop transmission mode. In the prior art, there is a DMRS-based closed-loop transmission mode but no DMRS-based open-loop transmission mode. A DMRS-based open-loop transmission mode is introduced into R14 (Release 14) and specifically includes a DMRS-based open-loop transmission mode and a DMRS-based semi-open-loop transmission mode.

In the DMRS-based closed-loop transmission mode, UE needs to feed back channel precoding matrix indication (Precoding Matrix Indication, PMI) information, and a base station determines a transmission mode for data based on the PMI. The DMRS-based open-loop transmission mode refers to that, the UE does not need to feed back the PMI information to the base station, and when sending a physical downlink control channel (Physical Downlink Control Channel, PDCCH), the base station uses a precoding vector or matrix corresponding to all codebooks, or uses a group of precoding vectors or matrices designated by the base station. The DMRS-based semi-open-loop transmission mode refers to that, the UE needs to feed back a part of the PMI to the base station, where the part of the PMI is used to help the base station designate a group of precoding vectors or matrices, and the base station determines a transmission mode for data based on the PMI.

Figure 3:
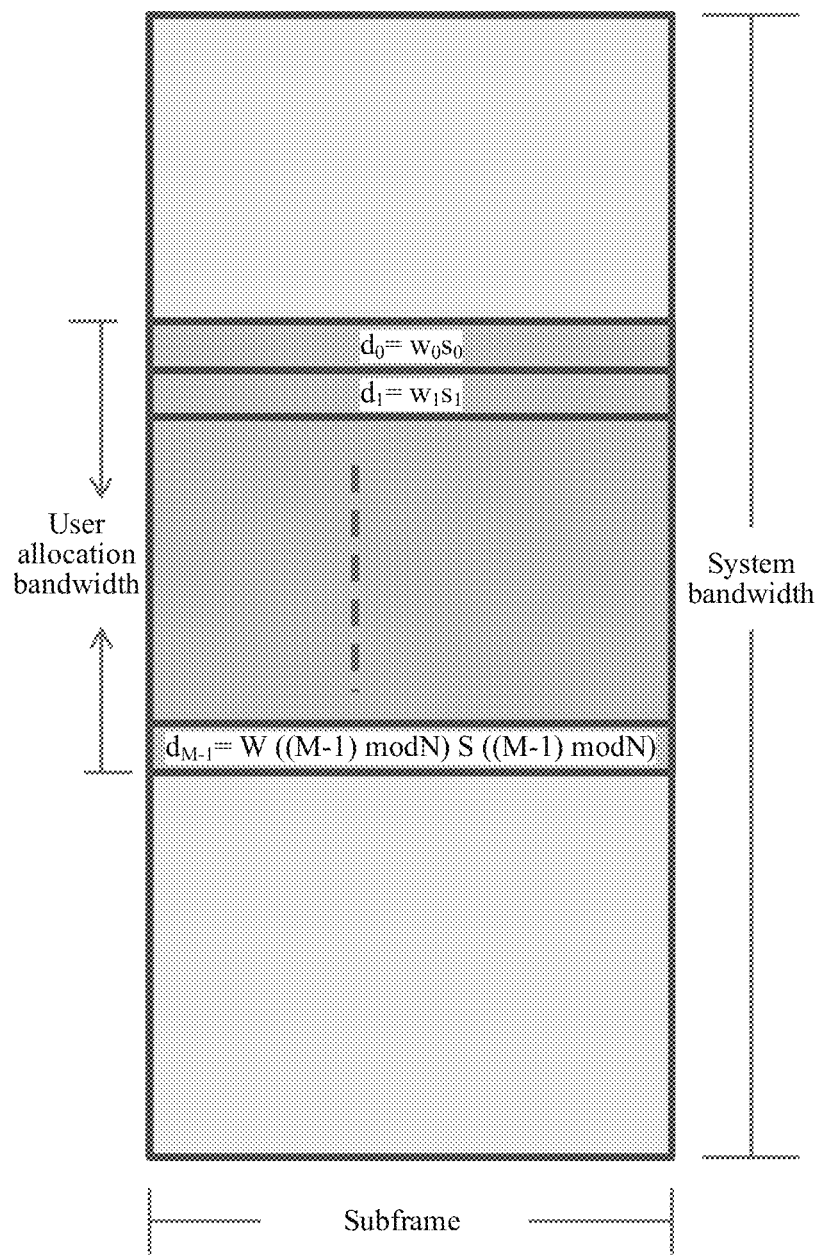
FIG. 3 is a schematic diagram of open-loop or semi-open-loop bandwidth allocation according to an embodiment of the present invention.

A schematic diagram of open-loop or semi-open-loop user bandwidth allocation is shown in FIG. 3.

For example, when a rank is R, a base station designates a group of precoding matrices, and the group of precoding matrices includes N precoding matrices, that is, $\{w_0, w_1, \ldots, w_{N-1}\}$. The base station transmits a PDSCH channel to UE. In a bandwidth allocated to the UE, the N precoding matrices are used in turn based on a rule, for example, a first subcarrier: $d_0 = w_0 s_0$ a second subcarrier: $d_1 = w_1 s_1$

...

an $M^{th}$ subcarrier: $d_{M-1} = w_{(M-1) \bmod N} s_{(M-1) \bmod N}$ where $d_{m-1}$ is a data signal sent by the base station on the $M^{th}$ subcarrier, a dimension of $d_{m-1}$ is $N_t \times 1$, and $N_t$ is a quantity of transmit antenna ports at the base station end; and a dimension of $w_{m-1}$ is $N_t \times R$, and a dimension of $s_{m-1}$ is $R \times 1$, representing R layers of data symbols sent on each subcarrier.

In a DMRS-based transmission mode, the base station maps data obtained after layer mapping to an antenna port by using a precoding matrix and transmits the data. In addition, a port number of a DMRS used to demodulate a data channel needs to be indicated to the user equipment, so that the user equipment can demodulate the data.

In R13, a previous downlink transmission mode 9 (Transmission Mode 9, TM9 for short), and a downlink transmission mode 10 (Transmission Mode 10, TM10 for short), the base station needs to indicate the port number of the DMRS used to demodulate the data channel to the user equipment through a downlink control channel PDCCH.

In a protocol previous to R13 (Release 13), there are three bits in a downlink control information (Downlink Control Information, DCI) in the PDCCH to indicate the port number of the DMRS, and a DMRS port mapping table is shown in Table 1. Values of the three bits are DMRS indication values (Value), respectively used to indicate different DMRS messages (Message). The left part of Table 1 illustrates DMRS messages (Message) corresponding to different DMRS indication values (Value) when there is one codeword (One Codeword). The right part of Table 1 illustrates DMRS messages (Message) corresponding to different DMRS indication values (Value) when there are two codewords (Two Codewords). A DMRS message includes information such as a combination of DMRS port (Port) numbers, a quantity of data mapping layers (layer), and a scrambling code ID (Scrambling-code identification, Nscid).

TABLE 1

| (One Codeword): Codeword 0 enabled, Codeword 1 disabled | | Two Codewords: Codeword 0 enabled, Codeword 1 enabled | |
|---|---|---|---|
| Value | Message | Value | Message |
| 0 | layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

As shown in Table 1, when the base station allocates two codewords (Two Codewords) to the user equipment, if the DMRS indication value (Value) is 2, it indicates that the data symbol is divided into three layers to be transmitted, and a DMRS used to demodulate the data occupies port numbers 7 to 9.

In the protocol of R13, there are four bits in DCI to indicate a port number of a DMRS, and a DMRS port mapping table is shown in Table 2, to agree on DMRS messages that are respectively represented by DMRS indication values 0 to 15 in a case of one codeword and in a case of two codewords.

TABLE 2

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ (OCC = 2) | 0 | 2 layers, ports 7-8, $n_{SCID} = 0$ (OCC = 2) |
| 1 | 1 layer, port 7, $n_{SCID} = 1$ (OCC = 2) | 1 | 2 layers, ports 7-8, $n_{SCID} = 1$ (OCC = 2) |
| 2 | 1 layer, port 8, $n_{SCID} = 0$ (OCC = 2) | 2 | 2 layers, ports 7-8, $n_{SCID} = 0$ (OCC = 4) |
| 3 | 1 layer, port 8, $n_{SCID} = 1$ (OCC = 2) | 3 | 2 layers, ports 7-8, $n_{SCID} = 1$ (OCC = 4) |
| 4 | 1 layer, port 7, $n_{SCID} = 0$ (OCC = 4) | 4 | 2 layers, ports 11, 13, $n_{SCID} = 0$ (OCC = 4) |
| 5 | 1 layer, port 7, $n_{SCID} = 1$ (OCC = 4) | 5 | 2 layers, ports 11, 13, $n_{SCID} = 1$ (OCC = 4) |
| 6 | 1 layer, port 8, $n_{SCID} = 0$ (OCC = 4) | 6 | 3 layers, ports 7-9 |
| 7 | 1 layer, port 8, $n_{SCID} = 1$ (OCC = 4) | 7 | 4 layers, ports 7-10 |
| 8 | 1 layer, port 11, $n_{SCID} = 0$ (OCC = 4) | 8 | 5 layers, ports 7-11 |
| 9 | 1 layer, port 11, $n_{SCID} = 1$ (OCC = 4) | 9 | 6 layers, ports 7-12 |
| 10 | 1 layer, port 13, $n_{SCID} = 0$ (OCC = 4) | 10 | 7 layers, ports 7-13 |
| 11 | 1 layer, port 13, $n_{SCID} = 1$ (OCC = 4) | 11 | 8 layers, ports 7-14 |
| 12 | 2 layers, ports 7-8 | 12 | Reserved |
| 13 | 3 layers, ports 7-9 | 13 | Reserved |
| 14 | 4 layers, ports 7-10 | 14 | Reserved |
| 15 | Reserved | 15 | Reserved |

A DMRS-based open-loop or semi-open-loop transmission mode (usually referred to as a DMRS-based open-loop transmission mode) is introduced into Release 14 (Release 14, R14) in LTE. Therefore, in the transmission technology, a manner in which downlink data is processed is different from a closed-loop transmission mode. For example, in the closed-loop transmission mode, weighting is performed on data in at least one resource block (Resource Block, RB for short) by using a same precoding vector/matrix. However, in the open-loop transmission mode, weighting may be performed on different subcarriers in an RB by using different precoding vectors/vectors. In addition, in the DMRS-based open-loop transmission mode, there is a possible transmission solution that a quantity of transport layers of data is not necessarily the same as a quantity of DMRS ports. For example, when the quantity of transport layers of data is 1, the quantity of DMRS ports is 2. This is where the DMRS-based open-loop transmission mode is different from the closed-loop transmission solution. Therefore, when the user demodulates the received data, the user first needs to learn DMRS port information required for demodulating the data and a transmission mode used by the base station to deliver the data, that is, an open-loop transmission mode or a closed-loop transmission mode. Therefore, a set of methods for indicating information such as DMRS port information needs to be re-designed.

The following describes a method in which a base station indicates a reference symbol to user equipment in a closed-loop transmission mode and an open-loop transmission mode in the embodiments of the present invention. It should be noted that, different wireless communications systems have different reference symbols, and a reference symbol in LTE is a demodulation reference signal DMRS.

Figure 4:
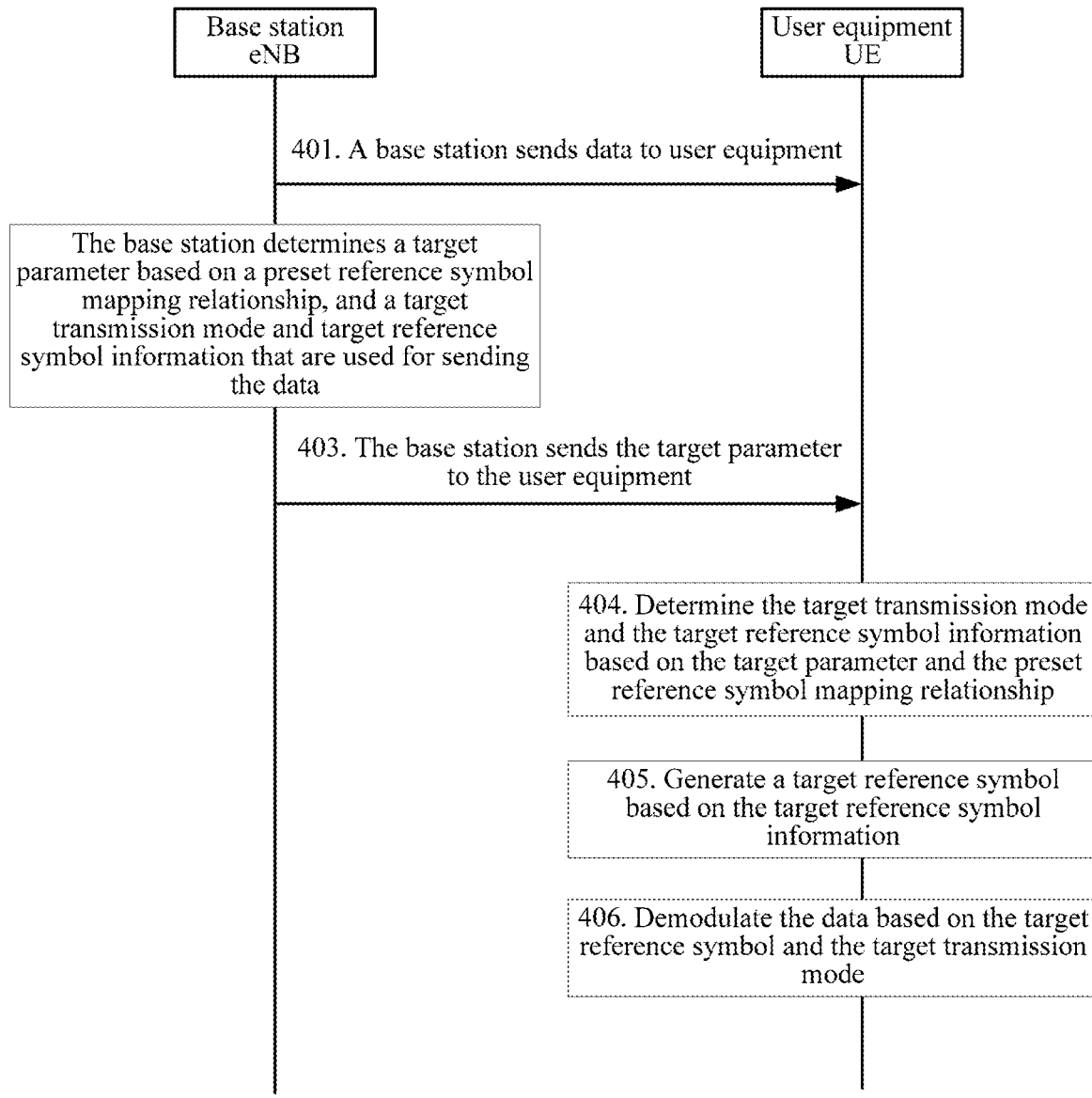
FIG. 4 is a schematic diagram of signal interaction of reference symbol indication performed between a base station and a terminal according to an embodiment of the present invention.

A diagram of information exchange in a reference symbol indication method and between a base station and user equipment is shown in FIG. 4.

401. The base station sends data to the user equipment.

Specifically, the base station sends the data to the user equipment through a downlink channel PDSCH of downlink user data.

402. The base station determines a target parameter based on a preset reference symbol mapping relationship, and a target transmission mode and target reference symbol information that are used to send the data.

When sending the data, the base station needs to notify the user equipment of a transmission mode (the target transmission mode) used for the downlink data and reference symbol information (the target reference symbol information) used to send the data, so that the user equipment can demodulate the data. In this embodiment of the present invention, the base station notifies, by sending the target parameter to the user equipment, the user equipment of the target transmission mode and the target reference symbol information that are used by the base station to send the data, to reduce a quantity of bits used for transmitting indication information.

Both the base station and the user equipment have a preset reference symbol mapping relationship. The preset reference symbol mapping relationship includes a mapping relationship between a reference symbol indication (a DMRS indication value in LTE), reference symbol information (a DMRS message in LTE), and a transmission mode. The transmission mode includes an open-loop transmission mode and a closed-loop transmission mode.

The base station determines the target parameter based on the preset reference symbol mapping relationship, and the target transmission mode and target reference symbol information that are used to send the data.

Optionally, the preset reference symbol mapping relationships of the user equipment and the base station may be stored in a form of one or more mapping tables, or may be obtained from another network element in a system.

403. The base station sends the target parameter to the user equipment, and the user equipment receives the target parameter sent by the base station.

Specifically, the target parameter includes a target reference symbol indication, and the target reference symbol indication is a DMRS indication (that is, a DMRS indication value) in LTE.

404. The user equipment determines the target transmission mode and the target reference symbol information based on the target parameter and the preset reference symbol mapping relationship.

The user equipment determines, based on the target parameter and the preset reference symbol mapping relationship of the terminal, the target transmission mode and the target reference symbol information that correspond to the target reference symbol indication in the target parameter. The target transmission mode is one of the open-loop transmission mode or the closed-loop transmission mode.

405. The user equipment generates a target reference symbol based on the target reference symbol information.

After obtaining the target reference symbol information, the user equipment generates the target reference symbol based on the target reference symbol information. In LTE, a DMRS is generated based on a DMRS message.

406. The user equipment demodulates the data based on the target reference symbol and the target transmission mode.

After generating the target reference symbol, the user equipment demodulates the data based on the target reference symbol and the target transmission mode. Specifically, in LTE, channel estimation is performed based on the DMRS, and then data is demodulated based on the transmission mode.

In this embodiment of the present invention, both the base station and the user equipment have a preset reference symbol mapping relationship, and the transmission mode and the reference symbol information that are used to send the data are indicated between the base station and the user equipment by using the target parameter, so that the user equipment can demodulate the data. In an LTE system, the reference symbol is a DMRS. This embodiment of the present invention may provide a DMRS port indication method for DMRS-based open-loop and closed-loop transmission between the base station and the user equipment.

The solution is described in detail in the following by using a reference symbol in LTE—a demodulation reference signal DMRS as an example.

Specifically, the preset reference symbol mapping relationships of the base station and the user equipment may exist in a form of a DMRS table in two expression forms.

First expression form: Both the user equipment and the base station have two DMRS tables, and the two DMRS tables respectively correspond to a DMRS message in an open-loop transmission solution and a DMRS message in a closed-loop transmission solution.

The preset reference symbol mapping relationship includes a first mapping table and a second mapping table, the first mapping table includes a mapping relationship between a reference symbol indication and reference symbol information in an open-loop transmission mode, and the second mapping table includes a mapping relationship between a reference symbol indication and reference symbol information in a closed-loop transmission mode.

That is, the first mapping table is an open-loop DMRS table, and the second mapping table is a closed-loop DMRS table. The open-loop DMRS table includes a mapping relationship between a DMRS indication value and the DMRS message in the open-loop transmission mode, and the closed-loop DMRS table includes a mapping relationship between a DMRS indication value and the DMRS message in the closed-loop transmission mode.

The closed-loop DMRS table may be a closed-loop DMRS port mapping table (referring to Table 1) in a protocol previous to the R13 protocol, or may be a closed-loop DMRS port mapping table (referring to Table 2) in the R13 protocol.

Content of the open-loop DMRS table is shown in Table 3.

TABLE 3

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, ports 7-8, $n_{SCID}$ = 1 (OCC = 2) | 0 | 2 layers, ports 7-8, $n_{SCID}$ = 0 (OCC = 2) |
| 1 | 1 layer, ports 7-8, $n_{SCID}$ = 1 (OCC = 2) | 1 | 2 layers, ports 7-8, $n_{SCID}$ = 1 (OCC = 2) |
| 2 | 2 layers, port 8 | 2 | 3 layers, ports 7-10 |
| 3 | 3 layers, ports 7-10 | 3 | 4 layers, ports 7-10 |
| 4 | 4 layers, ports 7-10 | 4 | Reserved |
| 5 | Reserved | 5 | Reserved |
| 6 | Reserved | 6 | Reserved |
| 7 | Reserved | 7 | Reserved |

In the open-loop DMRS table, in the DMRS message (Message) indicated by the DMRS indication value (Value), OCC=4 is not supported, and OCC should be less than or equal to 2, and the quantity of transport layers (layer) of data is less than or equal to 4. This is because, on the one hand, when the terminal moves at a high speed, performance is very poor when OCC=4, and it is very difficult to support high dimensional MIMO. On the other hand, by limiting the OCC and the quantity of layers of data, a quantity of bits used to indicate DMRS port information can be reduced.

In this manner, the base station determines a to-be-used DMRS table based on the transmission mode used to send the data, then determines a DMRS indication value (the DMRS indication) based on the DMRS message used to send the data, and determines, based on the transmission mode used to send the data, a transmission mode indication to be sent to the user equipment.

Therefore, in addition to needing to send the DMRS indication to the user equipment, the base station further needs to send a target transmission mode indication to the user equipment, to indicate the data transmission mode, that is, to indicate a to-be-used DMRS table. Therefore, the target parameter sent by the base station to the user equipment not only includes the DMRS indication, but also includes the target transmission mode indication.

The base station sends the target parameter to the user equipment in two manners.

In a first manner, the user equipment is notified, by using Radio Resource Control (Radio Resource Control, RRC for short) signaling, of the transmission mode used by the base station to deliver the data, and the DMRS indication value is sent to the user equipment through a PDCCH.

In a second manner, the user equipment is notified, by using a first field (which may be one bit) in a PDCCH, of a transmission mode used for downlink data of a current subframe, and the DMRS indication value is sent to the user equipment by using a second field (which may be three bits) in the PDCCH.

Compared with the first notification manner, the second PDCCH notification manner in which the base station may dynamically adjust the transmission mode used for the downlink data is more flexible.

After receiving the target transmission mode indication and the DMRS indication, the user equipment determines, based on the target transmission mode indication, a specific transmission mode (the open-loop transmission mode or the closed-loop transmission mode) used for the downlink data of the base station, and if the transmission mode is the open-loop transmission mode, a DMRS message corresponding to the DMRS indication is determined from the open-loop DMRS table, or if the transmission mode is the closed-loop transmission mode, a DMRS message corresponding to the DMRS indication is determined from the closed-loop DMRS table.

Then, the user equipment generates a DMRS based on the DMRS message, and demodulates the data based on the DMRS and the transmission mode used for the downlink data of the base station.

Another form of the DMRS table existing in the user equipment and the base station is:

Second expression form: Both the user equipment and the base station have a DMRS table, and different DMRS indication values (Value) in the DMRS table correspond to different DMRS messages and different transmission modes for downlink data.

Optionally, a feasible implementation is to perform joint coding on the closed-loop DMRS port mapping table in the protocol previous to R13 or in R13 and the open-loop DMRS table in this embodiment of the present invention to obtain one table.

For example, the DMRS table is a DMRS table obtained by performing joint coding on content of the closed-loop DMRS port mapping table (referring to Table 1) in the protocol previous to R13 and that of the open-loop DMRS table in Table 3, as shown in Table 4 below.

In Table 4, different DMRS indication values (Value) indicate different transmission modes and different DMRS messages. For example, values 0 to 7 represent the closed-loop transmission mode, and messages corresponding to 0 to 7 are DMRS messages in the closed-loop transmission mode; and values 8 to 15 represent the open-loop transmission mode, and messages corresponding to 8 to 15 are DMRS messages in the open-loop transmission mode.

TABLE 4

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID}$ = 0 | 0 | 2 layers, ports 7-8, $n_{SCID}$ = 0 |
| 1 | 1 layer, port 7, $n_{SCID}$ = 1 | 1 | 2 layers, ports 7-8, $n_{SCID}$ = 1 |
| 2 | 1 layer, port 8, $n_{SCID}$ = 0 | 2 | 3 layers, ports 7-9 |
| 3 | 1 layer, port 8, $n_{SCID}$ = 1 | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |
| 8 | 1 layer, ports 7-8, $n_{SCID}$ = 0, Semi-open-loop | 8 | 2 layers, ports 7-8, $n_{SCID}$ = 0, Semi-open-loop |
| 9 | 1 layer, ports 7-8, $n_{SCID}$ = 1, Semi-open-loop | 9 | 2 layers, ports 7-8, $n_{SCID}$ = 1, Semi-open-loop |
| 10 | 2 layers, ports 7-8, Semi-open-loop | 10 | 3 layers, ports 7-10, Semi-open-loop |
| 11 | 3 layers, ports 7-10, Semi-open-loop | 11 | 4 layers, ports 7-10, Semi-open-loop |
| 12 | 4 layers, ports 7-10, Semi-open-loop | 12 | Reserved |
| 13 | Reserved | 13 | Reserved |
| 14 | Reserved | 14 | Reserved |
| 15 | Reserved | 15 | Reserved |

Alternatively, the DMRS table is a DMRS table obtained by performing joint coding on content of the closed-loop DMRS port mapping table (referring to Table 2) defined in R13 and that of the open-loop DMRS table in Table 3, as shown in Table 5 below.

In Table 5, different DMRS indication values (Value) indicate different transmission modes and different DMRS messages. For example, values 0 to 15 represent the closed-loop transmission mode, and messages corresponding to 0 to 15 are DMRS messages in the closed-loop transmission mode; and values 16 to 31 represent the open-loop transmission mode, and messages corresponding to 16 to 31 are DMRS messages in the open-loop transmission mode.

TABLE 5

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID}$ = 0 (OCC = 2) | 0 | 2 layers, ports 7-8, $n_{SCID}$ = 0 (OCC = 2) |
| 1 | 1 layer, port 7, $n_{SCID}$ = 1 (OCC = 2) | 1 | 2 layers, ports 7-8, $n_{SCID}$ = 1 (OCC = 2) |
| 2 | 1 layer, port 8, $n_{SCID}$ = 0 (OCC = 2) | 2 | 2 layers, ports 7-8, $n_{SCID}$ = 0 (OCC = 4) |
| 3 | 1 layer, port 8, $n_{SCID}$ = 1 (OCC = 2) | 3 | 2 layers, ports 7-8, $n_{SCID}$ = 1 (OCC = 4) |
| 4 | 1 layer, port 7, $n_{SCID}$ = 0 (OCC = 4) | 4 | 2 layers, ports 11, 13, $n_{SCID}$ = 0 (OCC = 4) |
| 5 | 1 layer, port 7, $n_{SCID}$ = 1 (OCC = 4) | 5 | 2 layers, ports 11, 13, $n_{SCID}$ = 1 (OCC = 4) |
| 6 | 1 layer, port 8, $n_{SCID}$ = 0 (OCC = 4) | 6 | 3 layers, ports 7-9 |
| 7 | 1 layer, port 8, $n_{SCID}$ = 1 (OCC = 4) | 7 | 4 layers, ports 7-10 |
| 8 | 1 layer, port 11, $n_{SCID}$ = 0 (OCC = 4) | 8 | 5 layers, ports 7-11 |
| 9 | 1 layer, port 11, $n_{SCID}$ = 1 (OCC = 4) | 9 | 6 layers, ports 7-12 |
| 10 | 1 layer, port 13, $n_{SCID}$ = 0 (OCC = 4) | 10 | 7 layers, ports 7-13 |

TABLE 5-continued

| One Codeword: Codeword 0 enabled, Codeword 1 disabled | | Two Codewords: Codeword 0 enabled, Codeword 1 enabled | |
|---|---|---|---|
| Value | Message | Value | Message |
| 11 | 1 layer, port 13, $n_{SCID} = 1$ (OCC = 4) | 11 | 8 layers, ports 7-14 |
| 12 | 2 layers, ports 7-8 | 12 | Reserved |
| 13 | 3 layers, ports 7-9 | 13 | Reserved |
| 14 | 4 layers, ports 7-10 | 14 | Reserved |
| 15 | Reserved | 15 | Reserved |
| 16 | 1 layer, ports 7-8, $n_{SCID} = 0$, Semi-open-loop | 16 | 2 layers, ports 7-8, $n_{SCID} = 0$, Semi-open-loop |
| 17 | 1 layer, ports 7-8, $n_{SCID} = 1$, Semi-open-loop | 17 | 2 layers, ports 7-8, $n_{SCID} = 1$, Semi-open-loop |
| 18 | 2 layers, ports 7-8, Semi-open-loop | 18 | 3 layers, ports 7-10, Semi-open-loop |
| 19 | 3 layers, ports 7-10, Semi-open-loop | 19 | 4 layers, ports 7-10, Semi-open-loop |
| 20 | 4 layers, ports 7-10, Semi-open-loop | 20 | Reserved |
| 21-31 | Reserved | 21-31 | Reserved |

In this form of one DMRS table, the base station determines the DMRS indication value (the DMRS indication) based on the transmission mode used to send the data and the DMRS message used to send the data.

In this form of one DMRS table, different transmission modes are indicated by using different DMRS indication values (Value). Therefore, the base station does not need to notify the user equipment of the transmission mode used for the downlink data of the base station. In this manner, the base station can notify the user equipment of the DMRS indication value only through the PDCCH, and the terminal may obtain the DMRS message and the transmission mode used for the downlink based on the value. For example, if Table 5 is used, the DMRS indication value in the PDCCH channel delivered by the base station is 16, and one codeword (codeword) is used for transmission, the user equipment may determine, based on the DMRS table, that an open-loop transmission mode is used for the PDSCH channel of the downlink data of the base station, and DMRS port numbers 7 and 8 are used.

After receiving the DMRS indication value, the user equipment may determine, based on the DMRS indication value, a specific transmission mode (the open-loop transmission mode or the closed-loop transmission mode) used for the downlink data of the base station, and determines, in the DMRS table, a DMRS message corresponding to the DMRS indication.

Then, the user equipment generates a DMRS based on the DMRS message, and demodulates the data based on the DMRS and the transmission mode used for the downlink data of the base station.

Optionally, another feasible implementation in which both the user equipment and the base station have a preset DMRS table is: reusing some DMRS indications when $n_{scid}=1$ based on a closed-loop DMRS port mapping table in a protocol previous to R13 or in R13, and re-explaining a DMRS message corresponding to the DMRS indications when $n_{scid}=1$ as a DMRS message in the open-loop transmission mode.

In the prior art, that $n_{scid}=1$ in the closed-loop DMRS port mapping table is used to introduce a non-orthogonal DMRS port, so that more paired users can be supported in performing multi-user MIMO (Multiple User MIMO, MU-MIMO). However, in an actual system, large interference between ports is caused by the non-orthogonal DMRS port, leading to poor performance of multi-user pairing. It is usually considered that DMRS-based open-loop transmission is applicable to a high-speed movement scenario. In this case, a non-orthogonal DMRS port has poorer performance. Therefore, in the present invention, some of the DMRS indication values when $n_{scid}=1$ in an original closed-loop DMRS table are reused, and a DMRS message in an open-loop transmission mode is carried by using messages corresponding to the DMRS indication values when $n_{scid}=1$, so that a size of the original DMRS port mapping table is not changed.

Optionally, the DMRS message in the open-loop transmission mode may be carried by using a reserved (Reserved) bit in an existing closed-loop DMRS port mapping table in a protocol previous to R13 or in R13.

For example, Table 6 is obtained by extending a DMRS port mapping table defined in LTE Release 10. The DMRS indication value that is 1 when $n_{scid}=1$ in the DMRS port mapping table in R10 is re-explained as an open-loop transmission mode, a message corresponding to value=1 is replaced with a message in the open-loop transmission mode, to be used to indicate transmission of one layer of data, and a reserved part (value=7 in one codeword) is used to indicate transmission of two layers of data.

TABLE 6

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, ports 7-8, $n_{SCID} = 1$ (Semi-open-loop) | 1 | 2 layers, ports 7-8, $n_{SCID} = 1$ (Semi-open-loop) |
| 2 | 1 layer, port 8, $n_{SCID} = 0$ | 2 | 3 layers, ports 7-9 |
| 3 | 1 layer, port 8, $n_{SCID} = 1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | 2 layers, ports 7-8, Semi-open-loop | 7 | 8 layers, ports 7-14 |

Alternatively, for example, Table 7 is obtained by extending a DMRS port mapping table defined in LTE Release 13. The DMRS indication value that is 1 when $n_{scid}=1$ in the DMRS port mapping table in R13 is re-explained as an open-loop transmission mode, a message corresponding to value=1 is replaced with a message in the open-loop transmission mode, to be used to indicate transmission of one layer of data, and a reserved part (value=15 in one codeword) is used to indicate transmission of two layers of data.

TABLE 7

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ (OCC = 2) | 0 | 2 layers, ports 7-8, $n_{SCID} = 0$ (OCC = 2) |
| 1 | 1 layer, ports 7-8, $n_{SCID} = 1$ (OCC = 2), (semi-open-loop) | 1 | 2 layers, ports 7-8, $n_{SCID} = 1$ (OCC = 2), (semi-open-loop) |
| 2 | 1 layer, port 8, $n_{SCID} = 0$ (OCC = 2) | 2 | 2 layers, ports 7-8, $n_{SCID} = 0$ (OCC = 4) |

TABLE 7-continued

| One Codeword: Codeword 0 enabled, Codeword 1 disabled | | Two Codewords: Codeword 0 enabled, Codeword 1 enabled | |
|---|---|---|---|
| Value | Message | Value | Message |
| 3 | 1 layer, port 8, $n_{SCID}$ = 1 (OCC = 2) | 3 | 2 layers, ports 7-8, $n_{SCID}$ = 1 (OCC = 4) |
| 4 | 1 layer, port 7, $n_{SCID}$ = 0 (OCC = 4) | 4 | 2 layers, ports 11, 13, $n_{SCID}$ = 0 (OCC = 4) |
| 5 | 1 layer, port 7, $n_{SCID}$ = 1 (OCC = 4) | 5 | 2 layers, ports 11, 13, $n_{SCID}$ = 1 (OCC = 4) |
| 6 | 1 layer, port 8, $n_{SCID}$ = 0 (OCC = 4) | 6 | 3 layers, ports 7-9 |
| 7 | 1 layer, port 8, $n_{SCID}$ = 1 (OCC = 4) | 7 | 4 layers, ports 7-10 |
| 8 | 1 layer, port 11, $n_{SCID}$ = 0 (OCC = 4) | 8 | 5 layers, ports 7-11 |
| 9 | 1 layer, port 11, $n_{SCID}$ = 1 (OCC = 4) | 9 | 6 layers, ports 7-12 |
| 10 | 1 layer, port 13, $n_{SCID}$ = 0 (OCC = 4) | 10 | 7 layers, ports 7-13 |
| 11 | 1 layer, port 13, $n_{SCID}$ = 1 (OCC = 4) | 11 | 8 layers, ports 7-14 |
| 12 | 2 layers, ports 7-8 | 12 | Reserved |
| 13 | 3 layers, ports 7-9 | 13 | Reserved |
| 14 | 4 layers, ports 7-10 | 14 | Reserved |
| 15 | 2 layers, ports 7-8, semi-open-loop | 15 | Reserved |

It should be noted that, the values selected in Table 6 and Table 7 when $n_{scid}$=1 and the reserved value are merely an example, and another value when $n_{scid}$=1 may further be selected and reused. For example, in Table 7, value=3 may further be selected and reused, and another reserved (Reserved) value may further be selected and reused. For example, in Table 7, value=12, 13, 14, or 15 in the two codewords may be selected and reused, a plurality of values may be selected and reused based on an actual situation, and whether to select and reuse a value when $n_{scid}$=1 or a reserved value is not limited in this embodiment of the present invention.

Therefore, in this manner, the DMRS message in the open-loop transmission mode may be carried by reusing the DMRS indication when $n_{scid}$=1 or reusing the reserved DMRS indication, so that a size of an original DMRS port mapping table may not be changed.

In the embodiment of the manner shown in Table 4 or Table 5 in which two tables are integrated into one DMRS table, a new DMRS table (Table 4 or Table 5) is a table obtained by adding the DMRS indication value in the open-loop transmission mode and the DMRS message to an original table, so that content of the table is increased, more bits are required for indication, and a system is changed a lot. However, by using a manner in which some DMRS indications when $n_{scid}$=1 are reused based on an existing closed-loop DMRS port mapping table, a size of a DMRS table is not changed, and a quantity of bits used to transmit a DMRS indication value can be reduced.

In the manners shown in Table 4, Table 5, Table 6, and Table 7 in which both the user equipment and the base station have a preset DMRS table, different DMRS indication values (Value) in the table correspond to different DMRS messages and different transmission modes for downlink data. In this manner, DMRS port information and a downlink transmission mode are indicated through a PDCCH channel, and the transmission mode does not need to be indicated alone.

Likewise, in the DMRS message (Message) indicated by the DMRS indication value (Value) in the open-loop transmission mode, OCC=4 is not supported, and OCC should be less than or equal to 2, and the quantity of transport layers (layer) of data is less than or equal to 4. This is because, on the one hand, when the terminal moves at a high speed, performance is very poor when OCC=4, and it is very difficult to support high dimensional MIMO. On the other hand, by limiting the OCC and the quantity of layers of data, a quantity of bits used to indicate DMRS port information can be reduced.

The foregoing describes the reference symbol indication method in the embodiments of the present invention, and the following describes user equipment, a base station, and a system in the embodiments of the present invention.

Figure 5:
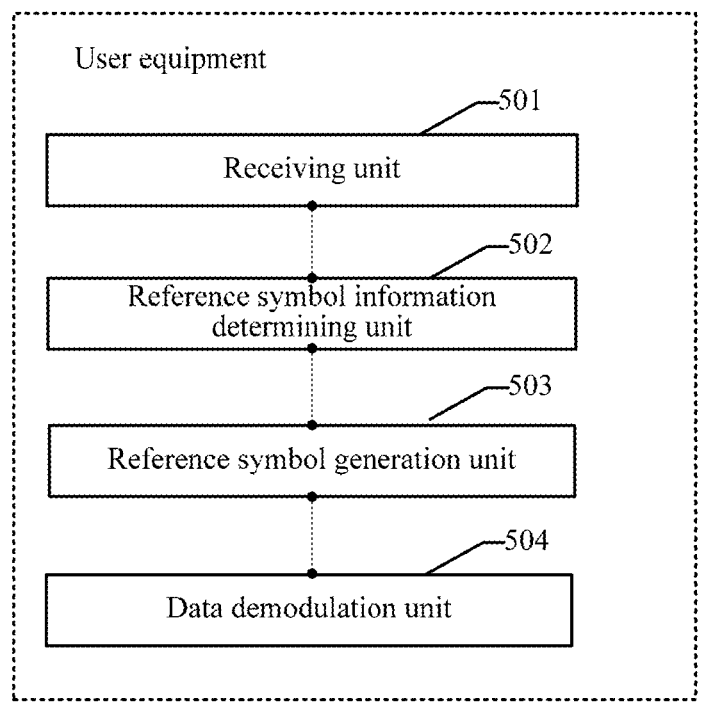
FIG. 5 is a schematic structural diagram of functional modules of user equipment according to an embodiment of the present invention.

FIG. 5 is a structural diagram of functional modules of user equipment according to an embodiment of the present invention and the functional modules specifically correspond to functions of the user equipment in the foregoing method embodiment. The functions may be implemented by using hardware, or may be implemented by executing a corresponding software program by hardware. The hardware and software include one or more unit modules corresponding to the foregoing functions, and the unit module may be software and/or hardware.

The user equipment specifically includes:
  a receiving unit 501, configured to receive a target parameter sent by a base station, where the target parameter includes a target reference symbol indication;
  a reference symbol information determining unit 502, configured to determine a target transmission mode and target reference symbol information based on the target parameter and a preset reference symbol mapping relationship, where the preset reference symbol mapping relationship includes a mapping relationship between a reference symbol indication, reference symbol information, and a transmission mode, and the transmission mode is a transmission mode used by the base station to send data and includes an open-loop transmission mode and a closed-loop transmission mode;
  a reference symbol generation unit 503, configured to generate a target reference symbol based on the target reference symbol information; and
  a data demodulation unit 504, configured to demodulate the data based on the target reference symbol and the target transmission mode.

In some specific implementations, the target parameter received by the receiving unit 501 further includes a target transmission mode indication;
  the preset reference symbol mapping relationship includes a first mapping table and a second mapping table, where the first mapping table includes a mapping relationship between the reference symbol indication and the reference symbol information in the open-loop transmission mode, and the second mapping table includes a mapping relationship between the reference symbol indication and the reference symbol information in the closed-loop transmission mode; and
  the reference symbol information determining unit 502 is specifically configured to: determine the target transmission mode based on the target transmission mode indication, determine, in the first mapping table and the second mapping table, a target mapping table based on the target transmission mode, and then determine, in the target mapping table, the target reference symbol information corresponding to the target reference symbol indication, where the target mapping table is one of the first mapping table and the second mapping table.

In some specific implementations, the receiving unit 501 is specifically configured to receive the target parameter sent by the base station through a downlink control channel PDCCH, where a first field in the PDCCH is used to indicate the target transmission mode indication, and a second field in the PDCCH is used to indicate the target reference symbol indication.

In some specific implementations, that the receiving unit 501 is specifically configured to receive the target transmission mode indication sent by the base station by using Radio Resource Control RRC signaling, and receive the target reference symbol indication sent by the base station through the PDCCH.

In some specific implementations, the preset reference symbol mapping relationship includes a third mapping table, where the third mapping table includes a mapping relationship between the reference symbol indication and the reference symbol information in the open-loop transmission mode and a mapping relationship between the reference symbol indication and the reference symbol information in the closed-loop transmission mode. The reference symbol information determining unit 502 is specifically configured to determine, in the third mapping table, the target transmission mode based on the target reference symbol indication, and determine, in the third mapping table, the target reference symbol information corresponding to the target reference symbol indication.

In some specific implementations, the reference symbol is a demodulation reference signal DMRS in an LTE system, the reference symbol indication is a DMRS indication, the reference symbol information is a DMRS message, and the DMRS message includes a scrambling code Nscid; and different values of the scrambling code Nscid are used to indicate different transmission modes corresponding to the DMRS indication, where in a DMRS message corresponding to a DMRS indication in the open-loop transmission mode, Nscid=1.

In some specific implementations, the reference symbol information includes an orthogonal cover code OCC, and a length of an orthogonal cover code in reference symbol information in the open-loop transmission mode is less than or equal to 2.

In some specific implementations, the reference symbol information includes a quantity of transport layers of data, and the quantity of transport layers of data in the reference symbol information in the open-loop transmission mode is less than or equal to 4.

In addition, the base station in the embodiments of the present invention specifically includes:
  a sending unit 601, configured to send data to user equipment; and
  a target parameter determining unit 602, configured to determine a target parameter based on a preset reference symbol mapping relationship, and a target transmission mode and target reference symbol information that are used to send the data, where the preset reference symbol mapping relationship includes a mapping relationship between a reference symbol indication, reference symbol information, and a transmission mode, and the transmission mode includes an open-loop transmission mode and a closed-loop transmission mode; where
  the sending unit 601 is further configured to send the target parameter to the user equipment, where the target parameter is used to instruct the user equipment to determine the target transmission mode and the target reference symbol information that are used by the base station to send the data, generate a target reference symbol based on the target reference symbol information, and then demodulate the data based on the target reference symbol and the target transmission mode.

Figure 6:
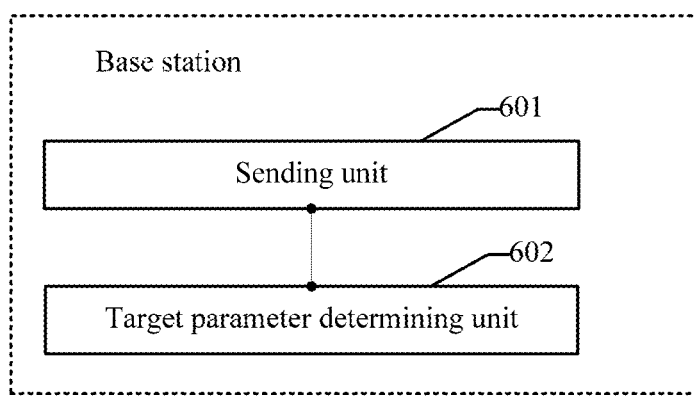
FIG. 6 is a schematic structural diagram of functional modules of a base station according to an embodiment of the present invention.

For information exchange between the functional modules of the user equipment shown in FIG. 5 and information exchange between the functional modules of the base station shown in FIG. 6, refer to the descriptions in the foregoing method embodiments, and details are not described herein again.

Figure 7:
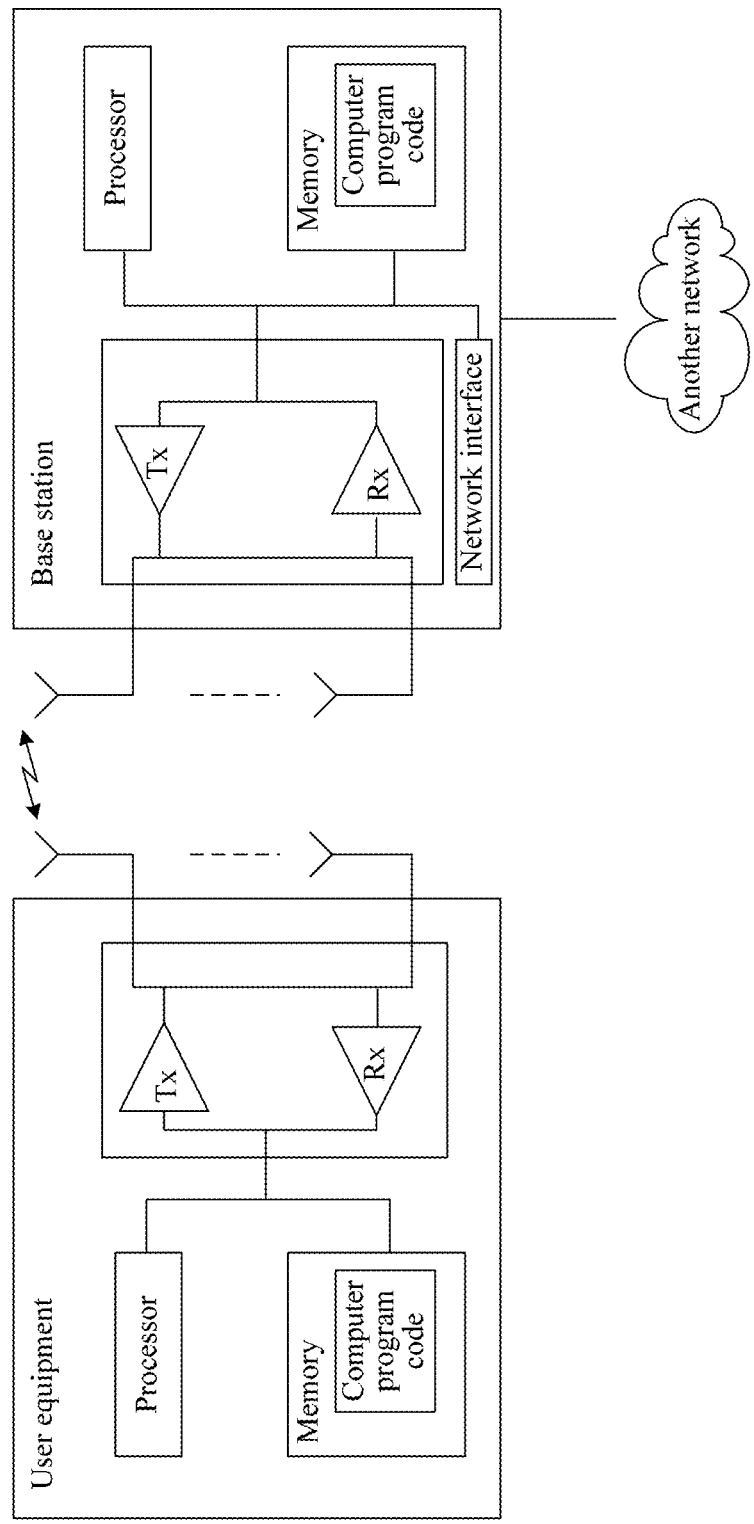
FIG. 7 is a schematic structural diagram of hardware of a reference symbol indication system, user equipment, and a base station according to an embodiment of the present invention.

In addition, the present invention further includes a reference symbol indication system. For a structure of the reference symbol indication system, refer to a description shown in FIG. 7. User equipment and a base station in the system in the embodiments of the present invention respectively have the functions of the user equipment and the functions of the base station in the foregoing method embodiments.

Wireless communication is performed between the user equipment and the base station by using a link. The user equipment includes one or more processors, one or more memories, and one or more transceivers (each transceiver includes a transmitter Tx and a receiver Rx) that are connected by using a bus. The one or more transceivers are connected to one or more antennas. The one or more memories include computer program code, and the processor performs a series of computer program code instruction operations in the memory, and specifically, performs all or some of the steps performed by the user equipment in the foregoing method embodiment.

The base station provides wireless access from the user equipment to a network, and includes one or more processors, one or more memories, one or more network interfaces, and one or more transceivers (each transceiver includes a receiver Rx and a transmitter Tx) that are connected by using a bus. The one or more transceivers are connected to an antenna or an antenna array. The one or more processors include computer program code. The network interface is connected to a core network by using a link (for example, a link between the network interface and the core network), or is connected to another base station by using a wired or wireless link. The processor performs a series of computer program code instruction operations in the memory, and specifically, performs all or some of the steps performed by the base station in the foregoing method embodiment.

In the specification, claims, and accompanying drawings of the present invention, the terms "first", "second", "third", "fourth", and so on (if any) are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

It may be clearly understood by a person skilled in the art that, for the purpose of convenient and brief description, for a detailed working process of the foregoing system, apparatus, and unit, refer to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

In this specification, specific examples are used to describe the principle and implementations of the present invention, and the description of the embodiments is only intended to help understand the method and core idea of the present invention. Meanwhile, a person of ordinary skill in the art may, based on the idea of the present invention, make modifications with respect to the specific implementations and the application scope. Therefore, the content of this specification shall not be construed as a limitation to the present invention.

What is claimed is:

1. A reference symbol indication method, comprising:
   receiving, by an apparatus, a target parameter sent by a base station, wherein the target parameter comprises a target reference symbol indication and a target transmission mode indication, the target transmission mode indication indicating a to-be-used mapping table used by the base station to send data;
   determining, by the apparatus, a target transmission mode and target reference symbol information based on the target parameter and a preset reference symbol mapping relationship, wherein the preset reference symbol mapping relationship comprises a first mapping table for open-loop transmission and a second mapping table for closed-loop transmission, wherein the preset reference symbol mapping relationship comprises a mapping relationship among a reference symbol indication, reference symbol information, and a transmission mode, wherein the transmission mode is a transmission mode used by the base station to send the data and comprises an open-loop transmission mode and a closed-loop transmission mode, and wherein determining the target transmission mode and the target reference symbol information comprises:
   determining the target transmission mode based on the target transmission mode indication comprised in the target parameter sent by the base station;
   determining, in the first mapping table and the second mapping table, a target mapping table based on the target transmission mode, wherein the target mapping table is one of the first mapping table and the second mapping table; and
   determining, in the target mapping table, the target reference symbol information corresponding to the target reference symbol indication comprised in the target parameter sent by the base station; and
   generating, by the apparatus, a target reference symbol based on the target reference symbol information, and demodulating the data based on the target reference symbol and the target transmission mode.

2. The method according to claim 1, wherein:
the first mapping table comprises a mapping relationship between the reference symbol indication and the reference symbol information in the open-loop transmission mode, and the second mapping table comprises a mapping relationship between the reference symbol indication and the reference symbol information in the closed-loop transmission mode.

3. The method according to claim 2, wherein:
the receiving, by the apparatus, a target parameter sent by a base station comprises:
   receiving, by the apparatus, the target transmission mode indication sent by the base station by using Radio Resource Control (RRC) signaling, and receiving the target reference symbol indication sent by the base station through a physical downlink control channel (PDCCH).

4. The method according to claim 1, wherein:
the reference symbol information comprises an orthogonal cover code (OCC) and a length of an OCC in reference symbol information in the open-loop transmission mode is less than or equal to 2.

5. The method according to claim 1, wherein:
the reference symbol information comprises a quantity of transport layers of data, and a quantity of transport layers of data in reference symbol information in the open-loop transmission mode is less than or equal to 4.

6. The method according to claim 1, wherein the apparatus is a user equipment.

7. An apparatus, comprising:
a transceiver, the transceiver configured to receive a target parameter sent by a base station, wherein the target parameter comprises a target reference symbol indication and a target transmission mode indication, the target transmission mode indication indicating a to-be-used mapping table used by the base station to send data; and
at least one processor, the at least one processor configured to:

determine a target transmission mode and target reference symbol information based on the target parameter and a preset reference symbol mapping relationship, wherein the preset reference symbol mapping relationship comprises a first mapping table for open-loop transmission and a second mapping table for closed-loop transmission, wherein the preset reference symbol mapping relationship comprises a mapping relationship among a reference symbol indication, reference symbol information, and a transmission mode, wherein the transmission mode is a transmission mode used by the base station to send the data and comprises an open-loop transmission mode and a closed-loop transmission mode, and wherein determining the target transmission mode and the target reference symbol information comprises:
    determining the target transmission mode based on the target transmission mode indication comprised in the target parameter sent by the base station;
    determining, in the first mapping table and the second mapping table, a target mapping table based on the target transmission mode, wherein the target mapping table is one of the first mapping table and the second mapping table; and
    determining, in the target mapping table, the target reference symbol information corresponding to the target reference symbol indication comprised in the target parameter sent by the base station;
generate a target reference symbol based on the target reference symbol information; and
demodulate the data based on the target reference symbol and the target transmission mode.

8. The apparatus according to claim 7, wherein:
the first mapping table comprises a mapping relationship between the reference symbol indication and the reference symbol information in the open-loop transmission mode, and the second mapping table comprises a mapping relationship between the reference symbol indication and the reference symbol information in the closed-loop transmission mode.

9. The apparatus according to claim 8, wherein:
the transceiver is configured to receive the target transmission mode indication sent by the base station by using Radio Resource Control (RRC) signaling, and receive the target reference symbol indication sent by the base station through a physical downlink control channel (PDCCH).

10. The apparatus according to claim 7, wherein:
the reference symbol information comprises an orthogonal cover code (OCC) and a length of an OCC in reference symbol information in the open-loop transmission mode is less than or equal to 2.

11. The apparatus according to claim 7, wherein:
the reference symbol information comprises a quantity of transport layers of data, and a quantity of transport layers of data in reference symbol information in the open-loop transmission mode is less than or equal to 4.

12. The apparatus according to claim 7, wherein the apparatus is a user equipment.

13. A non-transitory computer readable storage medium storing computer instructions, when executed by at least one processor, cause the at least one processor to perform operations comprising:
receiving a target parameter sent by a base station, wherein the target parameter comprises a target reference symbol indication and a target transmission mode indication, the target transmission mode indication indicating a to-be-used mapping table used by the base station to send data;
determining a target transmission mode and target reference symbol information based on the target parameter and a preset reference symbol mapping relationship, wherein the preset reference symbol mapping relationship comprises a first mapping table for open-loop transmission and a second mapping table for closed-loop transmission, wherein the preset reference symbol mapping relationship comprises a mapping relationship among a reference symbol indication, reference symbol information, and a transmission mode, wherein the transmission mode is a transmission mode used by the base station to send the data and comprises an open-loop transmission mode and a closed-loop transmission mode, and wherein determining the target transmission mode and the target reference symbol information comprises:
    determining the target transmission mode based on the target transmission mode indication comprised in the target parameter sent by the base station;
    determining, in the first mapping table and the second mapping table, a target mapping table based on the target transmission mode, wherein the target mapping table is one of the first mapping table and the second mapping table; and
    determining, in the target mapping table, the target reference symbol information corresponding to the target reference symbol indication comprised in the target parameter sent by the base station; and
generating a target reference symbol based on the target reference symbol information, and demodulating the data based on the target reference symbol and the target transmission mode.

14. The non-transitory computer readable storage medium according to claim 13, wherein:
the first mapping table comprises a mapping relationship between the reference symbol indication and the reference symbol information in the open-loop transmission mode, and the second mapping table comprises a mapping relationship between the reference symbol indication and the reference symbol information in the closed-loop transmission mode.

15. The non-transitory computer readable storage medium according to claim 14, wherein:
the receiving a target parameter sent by a base station comprises:
    receiving the target transmission mode indication sent by the base station by using Radio Resource Control (RRC) signaling, and receiving the target reference symbol indication sent by the base station through a physical downlink control channel (PDCCH).

16. The non-transitory computer readable storage medium according to claim 13, wherein:
the reference symbol information comprises an orthogonal cover code (OCC) and a length of an OCC in reference symbol information in the open-loop transmission mode is less than or equal to 2.

17. The non-transitory computer readable storage medium according to claim 13, wherein:
the reference symbol information comprises a quantity of transport layers of data, and a quantity of transport layers of data in reference symbol information in the open-loop transmission mode is less than or equal to 4.

* * * * *